United States Patent

Yehudai

(10) Patent No.: US 9,679,291 B2
(45) Date of Patent: Jun. 13, 2017

(54) SYSTEM AND METHOD OF TRANSMITTING DATA OVER A VOICE CHANNEL

(71) Applicant: DOVE VOICE TECHNOLOGIES LTD., Raanana (IL)

(72) Inventor: Yehuda Yehudai, Ra'anana (IL)

(73) Assignee: DOVE VOICE TECHNOLOGIES LTD., Ra'anana (IL)

( * ) Notice: Subject to any disclaimer, the term of this patent is extended or adjusted under 35 U.S.C. 154(b) by 807 days.

(21) Appl. No.: 13/910,255

(22) Filed: Jun. 5, 2013

(65) Prior Publication Data

US 2014/0101054 A1   Apr. 10, 2014

Related U.S. Application Data

(60) Provisional application No. 61/655,506, filed on Jun. 5, 2012.

(51) Int. Cl.
| | |
|---|---|
| H03C 5/00 | (2006.01) |
| H04L 27/02 | (2006.01) |
| H04L 27/10 | (2006.01) |
| G06Q 20/38 | (2012.01) |
| G06Q 20/32 | (2012.01) |

(52) U.S. Cl.
CPC ......... *G06Q 20/382* (2013.01); *G06Q 20/322* (2013.01); *G06Q 20/3272* (2013.01)

(58) Field of Classification Search
CPC ............. G06Q 20/382; G06Q 20/322; G06Q 20/3272; H04L 9/0877
USPC ....... 375/392, 272, 268, 300, 303, 279, 329, 375/308, 353
See application file for complete search history.

(56) References Cited

U.S. PATENT DOCUMENTS

| | | | |
|---|---|---|---|
| 3,621,396 A | 11/1971 | Daugherty | |
| 3,919,641 A | 11/1975 | Kurokawa et al. | |
| 5,838,797 A * | 11/1998 | Iwasaki ............... | H04L 27/2332 375/280 |
| 7,644,338 B2 * | 1/2010 | Park .................... | H03M 13/033 375/263 |
| 9,172,536 B2 * | 10/2015 | Lu ......................... | H04L 9/0877 |
| 2002/0146079 A1 | 10/2002 | Al-Khabit | |
| 2005/0041760 A1 * | 2/2005 | Yousef ..................... | H04L 1/06 375/340 |
| 2005/0094745 A1 | 5/2005 | Miyanaga et al. | |

(Continued)

FOREIGN PATENT DOCUMENTS

CN     102223234 A   * 10/2011

OTHER PUBLICATIONS

Search Report for International Application No. PCT/IL2013/051000 dated Mar. 30, 2014.

(Continued)

*Primary Examiner* — Phuong Phu
(74) *Attorney, Agent, or Firm* — Pearl Cohen Zedek Latzer Baratz LLP

(57) ABSTRACT

A method for transmitting data over a voice channel by transcoding a bit of the data stream into two bits, and converting each of such two bits into a value of a parameter of a curve of a sound frequency that can be carried on the voice channel. At the receiving end of the voice channel, the values of the parameters of the curve are reconverted into bits, and the pairs of bits are transcoded back into the bit of the data stream.

11 Claims, 10 Drawing Sheets

(56) References Cited

U.S. PATENT DOCUMENTS

2007/0088553 A1    4/2007  Johnson
2010/0115375 A1*  5/2010  Shen ................ H03M 13/1102
                                                               714/758
2011/0141918 A1    6/2011  Li
2012/0320442 A1   12/2012  Gabory

OTHER PUBLICATIONS

Notice of Allowance for U.S. Appl. No. 15/101,970 dated Dec. 12, 2016.

* cited by examiner

Fig. 3
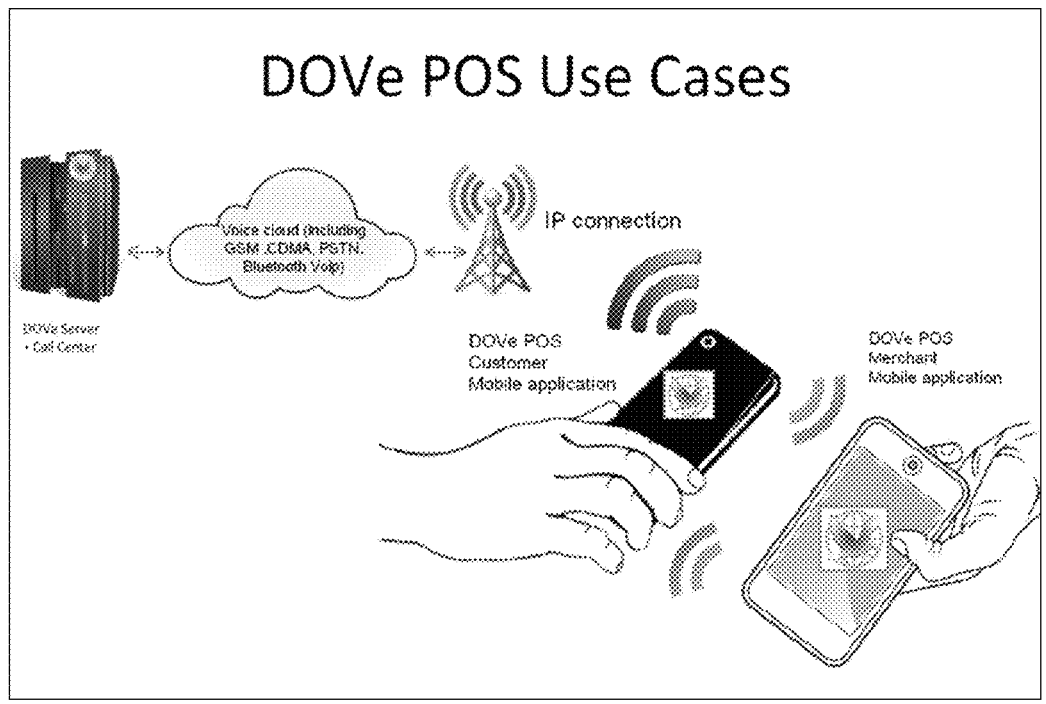
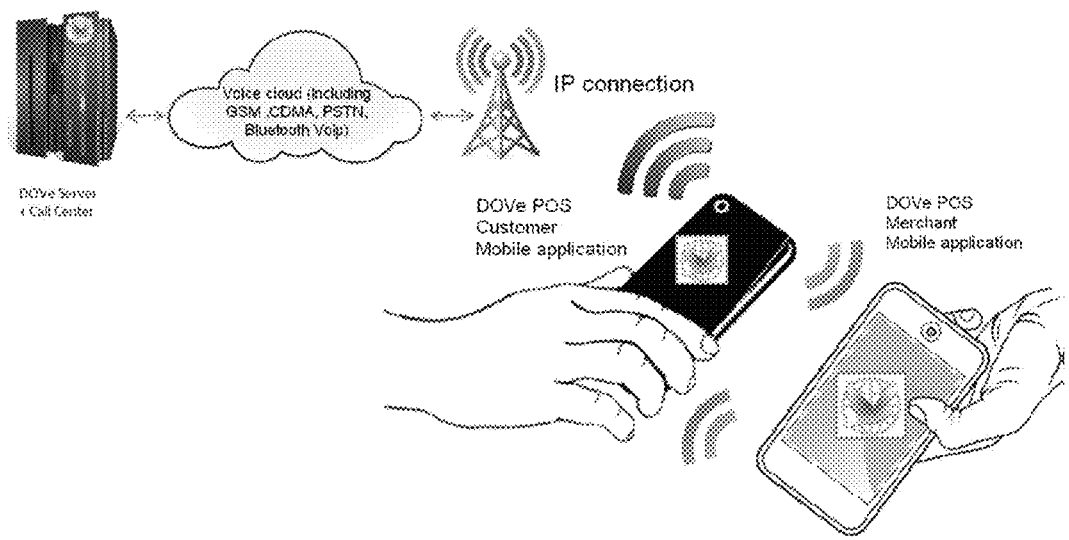
Fig. 4

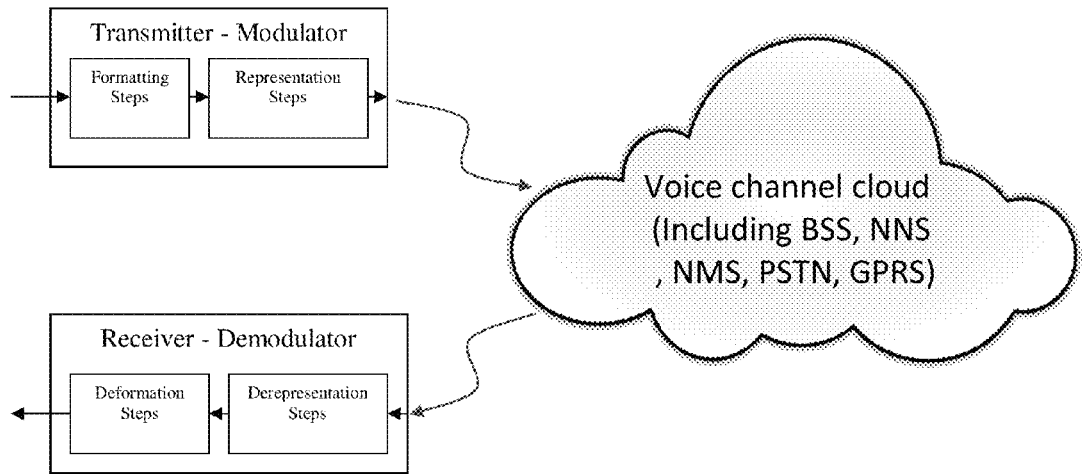
Fig. 7
Fig. 8
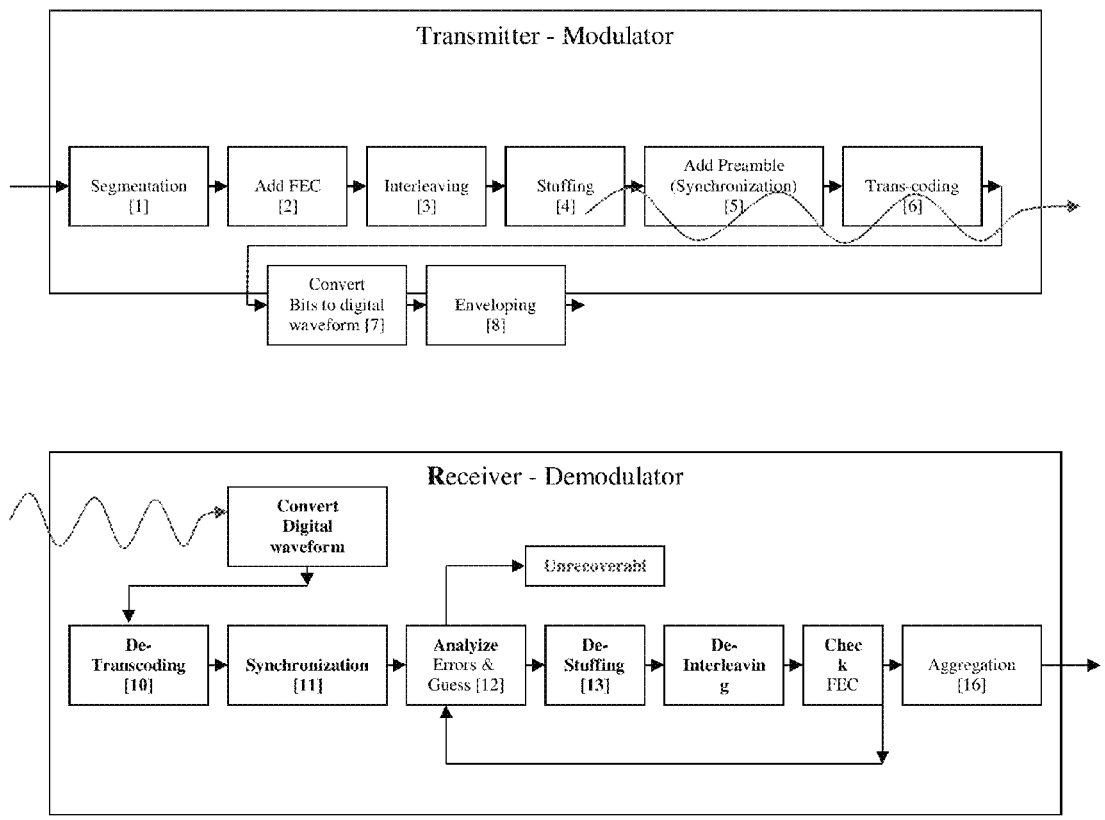

| Payload 1 | Payload 2 | Payload 3 | Payload 4 |

| Payload 1 | FEC 1 | Payload 2 | FEC 2 | Payload 3 | FEC 3 |

| Payload + FEC [1] | Payload + FEC [2] | Payload + FEC [3] |

| Payload + FEC [1] | Payload + FEC [2] | Payload + FEC [3] |

| Preamble | Payload + FEC [1] | Preamble | Payload + FEC [2] |

SYSTEM AND METHOD OF TRANSMITTING DATA OVER A VOICE CHANNEL

CROSS REFERENCE TO RELATED APPLICATIONS

This application claims priority from U.S. Provisional Patent Application 61/655,506, filed on Jun. 5, 2012 and entitled "SYSTEM AND METHOD OF TRANSMITTING DATA OVER A VOICE CHANNEL", incorporated by reference herein. This application claims priority to an application filed before Mar. 16, 2013, and contains one or more claims not entitled to a filing date before Mar. 16, 2013.

SUMMARY OF THE INVENTION

DOVe stands for Data Over Voice encoding.

Embodiments of the invention provide a method to support data transmission over and across any communication channels, and in particular over and across voice communication channels and voice interfaces; such data include encrypted voice and data.

POS Terminal Devices

POS (Point of sale) terminal devices today are developing towards utilizing mobile devices as means of payment. Several technologies are considered with regards to how the POS terminal shall interface the mobile and how the billing details of the consumer shall be transferred to the POS terminal. Each technology raises interoperability issues, since some mobiles support it while others don't. Some technologies require the mobile device to store sensitive information, putting the consumer at risk in case of mobile theft. User experience and ease of operation are also aspects which not all technologies accommodate well enough.

DOVe provides simple, secure and low-cost means for interfacing ANY mobile device for transaction of customer billing information by utilizing the audio interface of the mobile. This is done from the customer side either by [C1] having a voice call to DOVe server (feature phone), or by [C2] using DOVe customer application (Smart phones).

From the Merchant side it shall use either [M1] a POS terminal equipped with microphone, speaker, and DOVe SW, or [M2] have a DOVe dongle connected to the POS, or [M3] use a mobile phone or a tablet equipped with DOVe Merchant application.

Any of the customer's use cases [C1-C2] could work with any of the merchant's use cases [M1-M3] and only some of the combinations are described below in FIGS. 1-4. The customer will go through a ONE-TIME only registration phase either through [C2] DOVe customer application (smart phone) IP connection to server or [C1] by having a voice call to DOVe server (feature phone).

When a billing transaction is required; the customer [C1] calls the DOVe server number (same number for any transaction) or [C2] opens the DOVe customer application (smart phone). It then punches a short PIN code on the POS terminal [M1-M3] and puts its mobile near the POS terminal.

For a few seconds the POS terminal interacts securely with DOVe server either [C2] DOVe server interacts through IP connection to DOVe customer application and from it through the mobile audio interfaces to the POS, OR [C1] the server uses a call center which interacts through a voice call using the mobile device audio interface directly to the POS. An indication of transaction success is given, and the consumer is free to leave.

BRIEF DESCRIPTION OF THE DRAWINGS

FIG. 3 [C2-M2] is a description of a transaction of customer billing information done by DOVe customer application (Smart phones) using IP connection to DOVe Server and by DOVe customer application using DOVe voice communication with a DOVe POS dongle connected to a traditional POS device, in accordance with an embodiment of the invention.

FIG. 4 is a description of a transaction of customer billing information done by DOVe customer application (Smart phones) using IP connection to DOVe Server and by DOVe customer application using DOVe voice communication with a DOVe merchant application, in accordance with an embodiment of the invention.

FIG. 7 is a diagram of data Formation/Deformation, Representation/De-representation steps in modulator & demodulator, in accordance with an embodiment of the invention.

FIG. 8 is a diagram of DOVe Transmitter (modulator), Receiver (demodulator) blocks description. The green sine wave stands for digital sinusoids waveform symbols, in accordance with an embodiment of the invention.

DETAILED DESCRIPTION OF THE INVENTION

Figure 1:
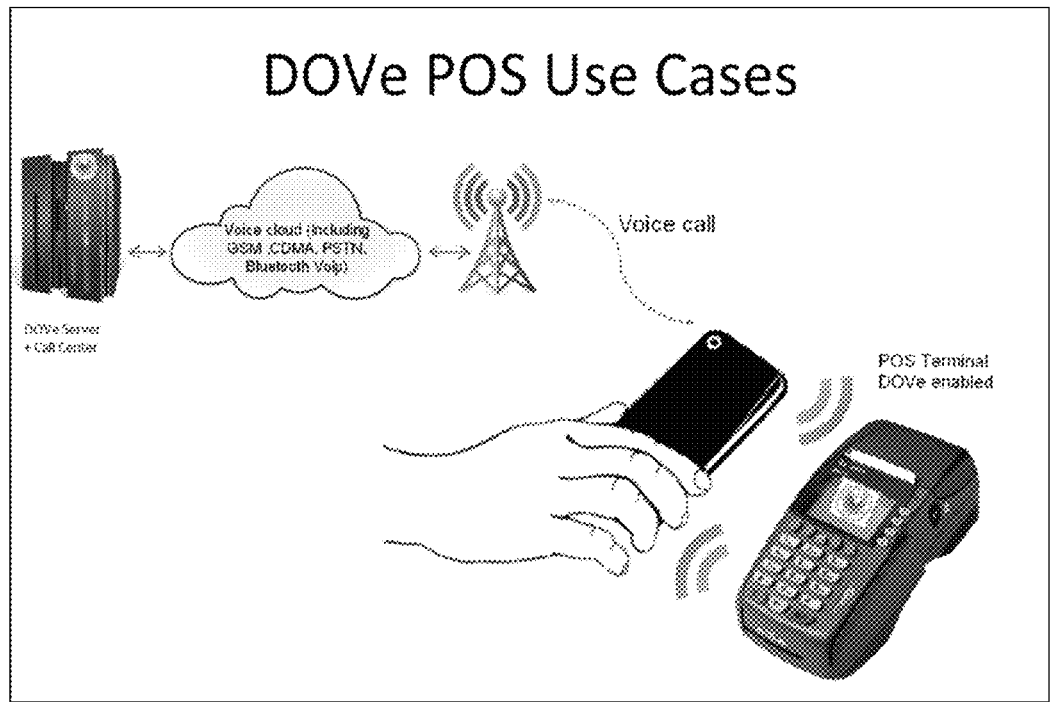
FIG. 1 [C1-M1] is description of a transaction of customer billing information done by having a voice call to DOVe call center (feature phone). DOVe Server uses DOVe voice communication to communicate through DOVe call center and the mobile phone with a DOVe enabled POS device, in accordance with an embodiment of the invention.
Figure 2:
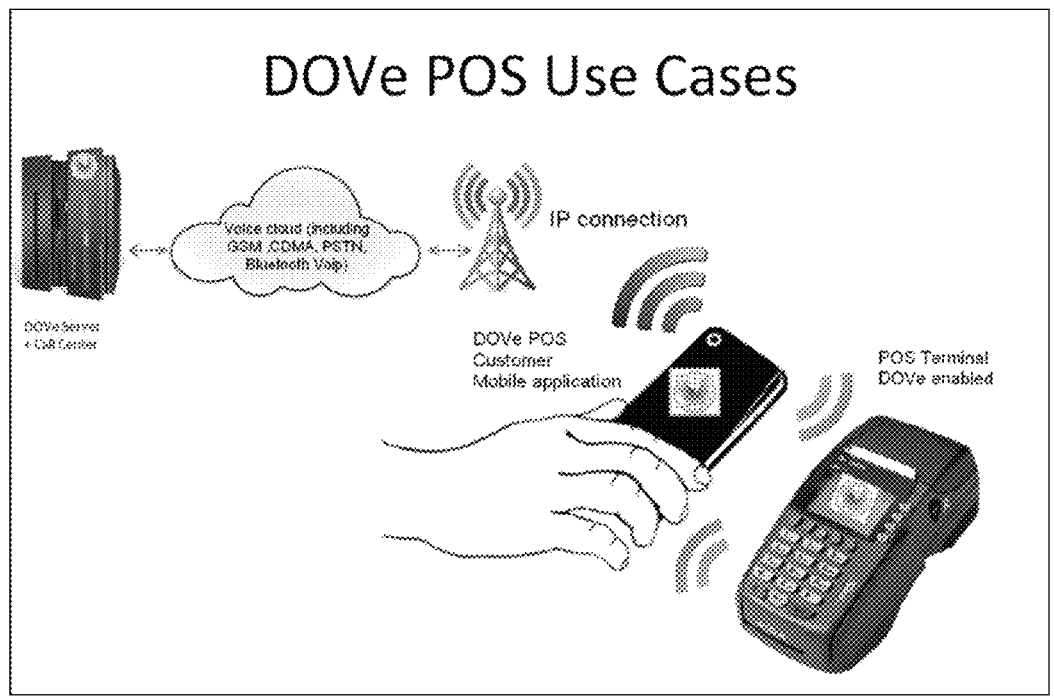
FIG. 2 [C2-M1] is a description of a transaction of customer billing information done by DOVe customer application (Smart phones) using IP connection to DOVe Server and by DOVe customer application using DOVe voice communication with a DOVe enabled POS device, in accordance with an embodiment of the invention.
Figure 5:
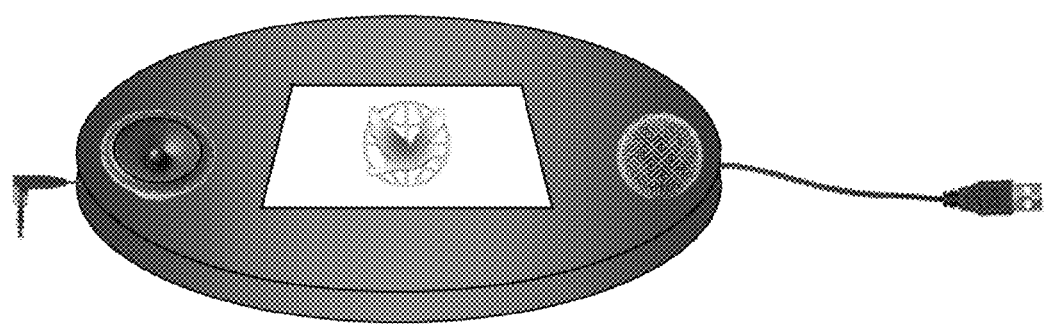
FIG. 5 is a diagram of a DOVe POS dongle including audio interface of microphone and speakers (an additional optional in/out audio wire interface) a touch screen LCD/keypad to receive input from customer and a Data in/out line to support connection with the POS terminal, in accordance with an embodiment of the invention.
Figure 6:
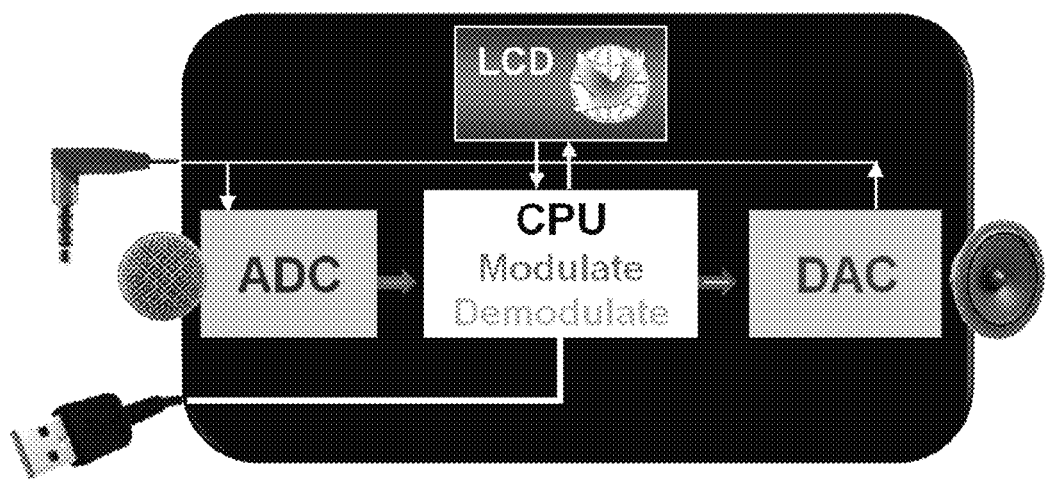
FIG. 6 is a DOVe POS dongle block diagram including audio interface of microphone and speakers (an additional optional in/out audio wire interface) a touch screen LCD/keypad to receive input from customer and a Data in/out line to support connection with the POS terminal, in accordance with an embodiment of the invention.

DOVe has no compatibility issues since any mobile device supports the audio interface. DOVe doesn't require any billing information to be kept on mobile—no risk at in case of mobile theft. DOVe User billing information is not exposed to merchant or disclosed at the POS device. DOVe operation is as simple as calling a number, its fast and doesn't cost much in terms of modifying the POS device.

DOVe provides a method to support data transmission over and across any voice channel or a voice interface (including but no limited to landline—PSTN, GSM, CDMA, Bluetooth, VoIP). While some voice channels are far from being ideal for data transmission DOVe provides a unique method to utilize them for data transmission.

GSM voice channel is a narrow-band (300-3400 Hz) channel, a fact that limits its achievable data rates. The GSM voice codecs used to compress the voice encompass a memory of previous samples it processed. This memory is used to calculate its current samples output—this feature increases the codecs compress ratio on the expense of causing distortions. These codecs are adaptive and keep changing their parameters during a call which makes it hard to predict their behavior. Additional GSM voice optimizations like VAD (DTX, CNG) and AGC also introduce distortions. The end-to-end voice call path may traverse a heterogeneous set of networks links thereby making the voice channel unpredictable. Errors frequently encountered by the GSM voice channel include: flips, insertions, deletions.

From the above reason and more conventional data modulation techniques suffer great distortions passing through the GSM voice channel and become useless.

Embodiments of DOVe IP technology use the voice channel or any voice interface for data transfer—optionally encrypted. DOVe may add its functionality on top of the already existing voice communication channel. DOVe is "transparent" towards the voice channel and does not impose infrastructure requirements.

DOVe Modem

Embodiments of the invention refer to methods to transmit and receive data over and across channels of communication networks in general and in particular over voice channel or voice interfaces (microphone & speakers) of telecommunication networks.

DOVe modulator allows translation of a digital input data into waveform symbols to be sent over a voice channel or voice interface. DOVe demodulator allows receipt of waveform symbols (containing the modulated data) from a voice channel or voice interface and retrieve back from it the input data. DOVe modulator translates the input data into robust waveform symbols which travel through a voice channel or voice interface (landline—PSTN, GSM, CDMA, Bluetooth, VoIP are included) and come out at the receiver with small modifications.

DOVe unique modulate/demodulate procedures are very simple and lightweight in the sense of the amount of calculation required, it will consume minimum CPU time and delays, which increase system performance and ease of implementation.

DOVe Modem Operation

Embodiments of DOVe modulator and demodulator components can be divided into data formatting/de-formatting steps and data representation/de-representation steps.

Modulator Steps:

Data Formation is performed over the input data stream of bits at the modulator and produces a formatted data stream of bits. Data Representation is performed at the modulator (after the Data Formation Steps) over the formatted data stream of bits and produce digital symbols.

Demodulator Steps:

At the demodulator Data De-representation is performed over the received digital symbols and the output is formatted data stream of bits. Data De-formation is performed over the formatted data stream of bits and the output is an unformatted stream of bits which is identical to the data stream of bits which was initially input into the Modulator.

FIG. 7: Data Formation/Deformation, Representation/De-representation steps in modulator & demodulator.

Data Formation Steps: Prior to translating the data into digital waveform symbols, DOVe modulator pass the input data through several steps of manipulations which include: [1] segmentation—dividing the raw data input stream into chunks of certain size to be payload inside the transmitted packets, [2] Adding FEC—Forward Error Correction information for packets, [3] interleaving, [4] stuffing, [5] adding synchronization information for packets, [6] trans-coding. A result is making the transmitted data more resilient against the distortions introduced by the GSM voice channel.

Data Representation Steps: the formatted data bit stream is [7] converted into digital sinusoid representation and then [8] enveloping is applied. The digital output stream of the last mentioned step is digital waveforms symbols.

Data De-representation Steps: The received digital waveforms symbols [9] get converted into a formatted data bit stream.

Data Deformation Steps:

At the receiver side after the demodulator translates from digital sinusoids into a formatted data bit stream the inverse of the data formation steps mentioned above are performed in order to retrieve the original information data: [10] de-trans coding, [11] synchronizing over the packets synchronization information and stripping it out of the data stream, [12] "guess" bit values for the error marked bits [13] de-stuffing, [14] de-interleaving, [15] checking validity of packets and fixing errors using the error correction information. Stripping out error correction from the data packet & extracting the payload original data, [16] aggregation—concatenating the data from the payloads into one single stream of data.

FIG. 8: DOVe Transmitter (modulator), Receiver (demodulator) blocks description. The green sine wave stands for digital sinusoids waveform symbols.

Data Formation Steps—Details:

Step [1] segmentation divides the data input stream into fixed size chunks of data to be used as payloads inside the transmitted packets. Preferably though not necessarily, a fixed size chunk of data would contain a number of bits which is a multiple of 8, so that the payload represent integer amount of bytes. Also by adding a header at the beginning of a DOVe packet, a variable sized payload may be used as well.

Figures 9, 10, 11, 12, 13, 14A:
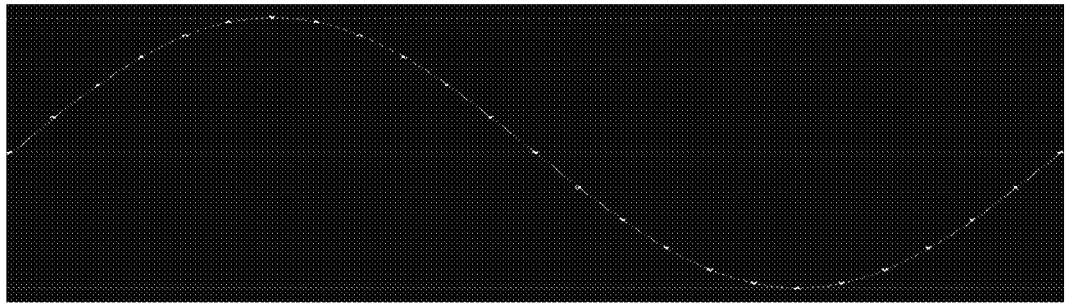
FIG. 9 is a diagram of data as a stream of Payloads, in accordance with an embodiment of the invention.
FIG. 10 is a diagram of data as a stream of pairs, each pair contains (1) Payload and (2) FEC, in accordance with an embodiment of the invention.
FIG. 11 is a diagram of data as a stream of Payloads & FEC interleaved, in accordance with an embodiment of the invention.
FIG. 12 is a diagram of data as a stream of Payloads & FEC interleaved and stuffed, in accordance with an embodiment of the invention.
FIG. 13 is a diagram of data as a stream of pairs, each pair contains: Preamble and Payloads & FEC interleaved and stuffed, in accordance with an embodiment of the invention.
FIG. 14A is a diagram of sinusoid used to create symbols, in accordance with an embodiment of the invention.

FIG. 9 shows data as a stream of Payloads.

Step [2] is calculate the forward error correction over a payload and add the FEC information to each packet. The FEC may be used at the receiver to identify errors introduced by the voice channel and also if possible correct them and by this minimize data loss due to voice channel/codec distortions. The type of FEC and amount of bits used for it will determine the max amount of fixable errors. In general the longer the FEC is, the less probability of error in packet validation, and the more errors it can help to find and fix, but also the more bandwidth it consumes and hence less throughputs is provided. The processing from this step onwards will be over the payload and FEC bits placed as packet.

FIG. 10: Data as a stream of pairs, each pair contains (1) Payload and (2) FEC.

Step [3] is interleaving, its purpose is to protect the data from a sudden burst of errors which might happen at the voice channel. Suppose several errors happen in a single burst, if this happen over the error correction information, it would be very hard to reconstruct the original data. Shuffling the bits of data and error correction in an agreed manner between modulator and demodulator promises that burst errors will actually affect the whole packet in evenly distributed manner. In fact by applying the inverse action to interleaving—de-interleaving—in the demodulator the burst errors are trans-positioned and are being spread evenly over the whole packet. Another option for interleaving is shuffling of bits from adjacent packets in a known order; this may also contribute to data transfer robustness in case a certain packet is unrecoverable.

In case of utilizing the later kind of interleaving it should be done prior to step [2].

FIG. 11: Data as a stream of Payloads & FEC interleaved.

Step [4] is stuffing. Stuffing means prevent certain sequences of data patterns by recognizing those patterns in the payload and FEC data stream and inserting "pattern breaking" control bits in between the original payload and FEC bits in order to break the patterns. In DOVe patterns of long zeros and ones are better avoided, this enhances DOVe ability to protect against deletion/insertion errors. The amount of maximum consecutive zeros/ones allowed is determined by the maximum amount of fixable errors.

FIG. 12: Data as a stream of Payloads & FEC interleaved and stuffed.

Step [5] is adding synchronization information for each packet which acts as the preamble of the packet. The synchronization information should be distinct and easily recognized within the data stream. One option is to send a pattern which would never be sent as data due to the appliance of step [4] the stuffing over the data. So if for example 6 consecutive ones/zeros may never appear in the data stream due stuffing (Applied after any 5 consecutive ones/zeros), the modulator can use 6 or more consecutive zero (or ones) pattern and send it to indicate the packet preamble.

Another option is representing the preamble by "distinct high level of amplitude" (rather then a special pattern of data) which will only be used for the preamble bits.

FIG. 13: Data as a stream of pairs, each pair contains: (1) Preamble and (2) Payloads & FEC interleaved and stuffed.

Step [6] is trans-coding. Trans-coding is a conversion of the data from one format to another. In case of DOVe trans-coding is done by the following rules:

$$\left\{ \begin{array}{c} 0 \rightarrow 01 \\ 1 \rightarrow 10 \end{array} \right\}$$

The trans-coding although reduces throughput adds robustness and homogeneity into the data which is subject to the various errors mentioned above due to the voice channel/codecs distortions. The trans-coding has also an important role in the identification of insertion/deletion and flip errors. In case of using "distinct high level of amplitude" in step [5] for preamble bits another rule will be added: P→20 where P represents a preamble bit and the 2 in "20" represents a very high amplitude "1" representation.

Data Representation Steps—Details:

Step [7] is the conversion of each bit into a digital sinusoid waveform symbol representation of it. The DOVe conversion of bit into waveform doesn't require any heavy mathematical calculations. A certain carrier wave frequency is chosen either upfront or during DOVe communication session within the frequency range of the voice channel (GSM voice channel—is between 300 Hz-3400 Hz). The reason for choosing a certain carrier frequency is that in order to pass through the voice channel, the waveforms must resemble as much as possible human voice and human voice has a fundamental frequency over long durations of time. Every symbol is actually a single sinusoid generated at the carrier wave frequency.

FIG. 14A: Perfect sinusoid used to create symbols.

The above doesn't limit the signal shape to be an exact sinusoid, and other shapes of periodic signals generated at periods according to the carrier wave frequency and which have the properties of a continuous phase and cyclic phase will satisfy.

Figure 14B:
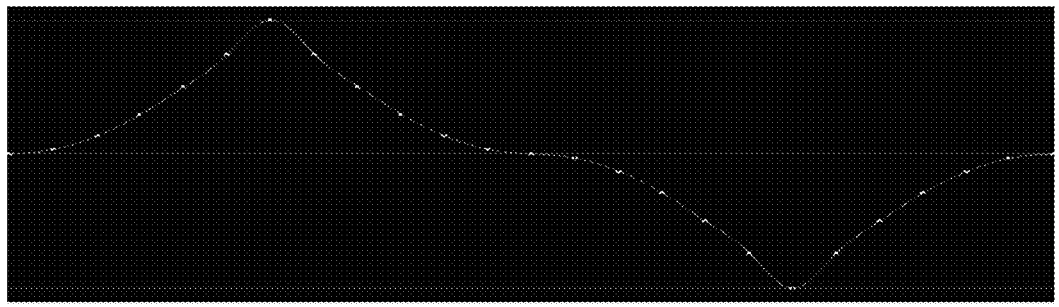
FIG. 14B is a diagram of another shape which may be used for symbols representation having: continuous phase and cyclic phase, in accordance with an embodiment of the invention.

FIG. 14B: Another shape which may be used for symbols representation having: continuous phase and cyclic phase.

The conversion is a variant of AM (or FM) modulation. The general modulation rule DOVe uses to modulate the data is: bits having the value of "1" will be modulated with a sinusoid having higher amplitude (higher frequency) than the previous sinusoid and bit having the value of "0" with sinusoid having lower amplitude (lower frequency) than the previous sinusoid.

When referring to classic amplitude modulation (frequency modulation) each amplitude level (frequency used) defines a certain symbol. The amount of bits each symbol represents equals to =⌊ Log 2(AMOUNT_OF_DIFFERENT_SYMBOLS_TYPES)⌋ {Shannon, Hartley}.

While the symbols to bit representation equation implies that the more levels one divides the given total amplitude dynamic range (more frequencies used) the bigger the amount of different symbols it gets and more bits per symbol it gets, and hence also the more throughput it gets, one must also bear in mind that the tradeoff for further dividing the total amplitude dynamic range (further using more and more frequencies which are closer in frequency domain) is that the distance between each symbol to its neighbor becomes smaller and so the signal itself becomes more sensitive to noises. So when designing an AM modulation (FM modulation) one must choose carefully the amount of levels (frequencies)/symbols used.

Suppose one wish to modulate a long sequence of bits using the already chosen AM (FM) modulation having a fixed amount of levels/symbols. If several consecutive bits happen to have identical value like "00000 . . . " or "11111 . . . " it is clear that just using the general AM modulation (FM modulation) rule mentioned above the modulator will quickly reach lowest/highest amplitude (frequency) and it will be impossible to continue to modulate the next consecutive bits properly. This is where trans-coding comes in handy.

Since at this stage DOVe modulator has already trans-coded the data, the data stream contains no more than 2 consecutive "00" and no more than 2 consecutive "11" which eliminated the problem of too many consecutive bits having identical values. And so it is enough to define only 3 amplitudes levels (3 frequencies) (which gives the signal robustness against noises, but also limit the bits per symbol and throughput) to be used to modulate the data: A_low, A_middle, A_high. (F_low, F_middle, F_high).

Figure 15A:
FIG. 15A is a diagram of a DOVe modulation example using AM: 3 amplitude levels A_low, A_middle, A_high. The example shows the symbols waveform representation of the already trans-coded sequence "010101011010100110", in accordance with an embodiment of the invention.

FIG. 15A: DOVe modulation example using AM: 3 amplitude levels A_low, A_middle, A_high. The example shows the symbols waveform representation of the already trans-coded sequence. "010101011010100110".

Figure 15B:
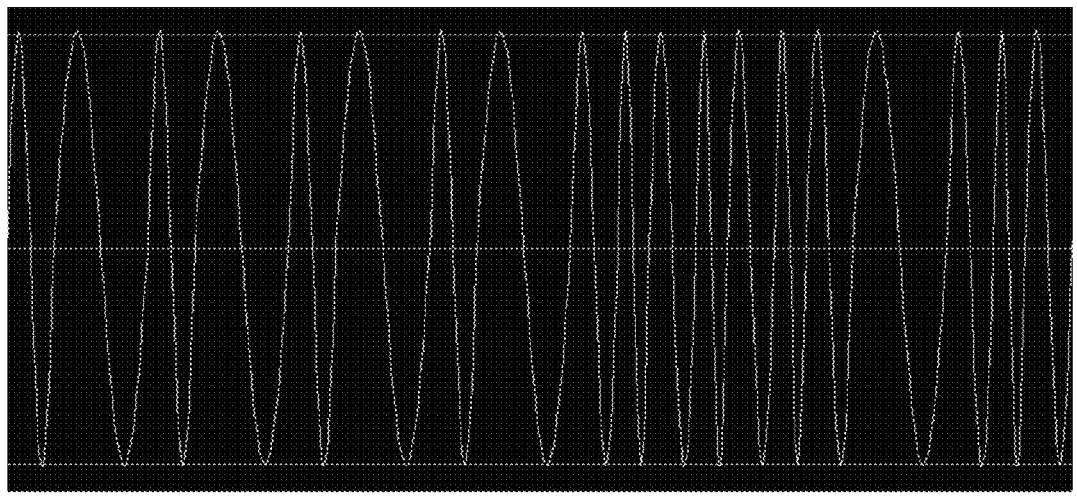
FIG. 15B is a diagram of a DOVe modulation example using FM: 3 Frequencies F_low, F_middle, F_high. The example shows the symbols waveform representation of the already trans-coded sequence "010101011010100110", in accordance with an embodiment of the invention.

FIG. 15B: DOVe modulation example using FM: 3 Frequencies F_low, F_middle, F_high. The example shows the symbols waveform representation of the already trans-coded sequence. "010101011010100110".

In case of using "distinct high level of amplitude" in step [5] for preamble bits there will be a $4^{th}$ level—used for preamble only—A_highest, which is distinctively higher.

Figure 16:
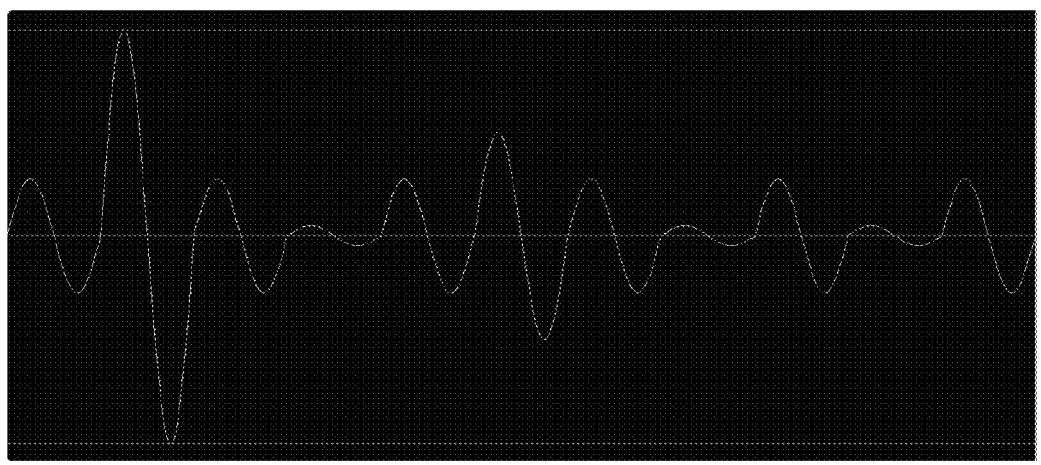
FIG. 16 is diagram of a DOVe modulation example using AM: 4 amplitude levels A_low, A_middle, A_high, A_highest. The example shows the symbols waveform representation of the already trans-coded sequence "2001100101", in accordance with an embodiment of the invention.

FIG. 16: DOVe modulation example using AM: 4 amplitude levels A_low, A_middle, A_high, A_highest. The example shows the symbols waveform representation of the already trans-coded sequence. "2001100101".

The modulation schema starts by setting Amp=A_middle, (Freq=F_middle) when the modulator encounters a new bit—according to the general modulation rule DOVe—if value is "1" it increases amplitude to the next level (increase frequency to the next higher frequency) and generate another sinusoid if new bit is "0" it decreases amplitude to the previous level (decrease frequency to the previous lower frequency) and generate another sinusoid. An exception is in case of using "distinct high level of amplitude" in step [5], upon a value of "2" the amplitude is set to A_highest and when a "0" will appear right after "2" the amplitude will be set to A_middle.

Step [8] is enveloping. Enveloping as its name implies is modifying the digital waveform symbols by multiplying it with a slowly varying envelope (slowly compared to the carrier frequency used). Such envelope might be any continuous phase shape like sin wave or triangular wave or any non continuous phase shape like chain-saw tooth. Enveloping is done in order to make the digital waveform symbols similar to real voice and by doing so overcome typical voice channel distortions related to AGC, VAD (DTX, CNG). Enveloping output is digital waveform symbols.

Figure 17A:
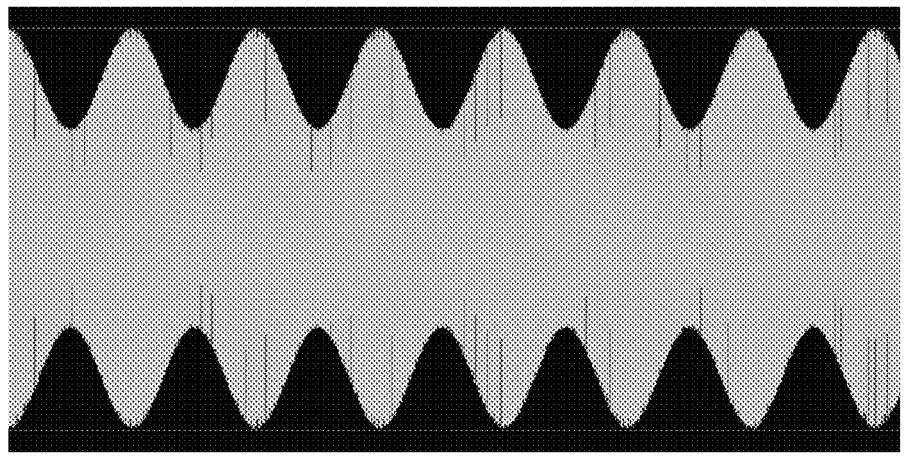
FIG. 17A shows a slowly varying enveloping using a continuous phase shape: sin wave.
Figure 17B:
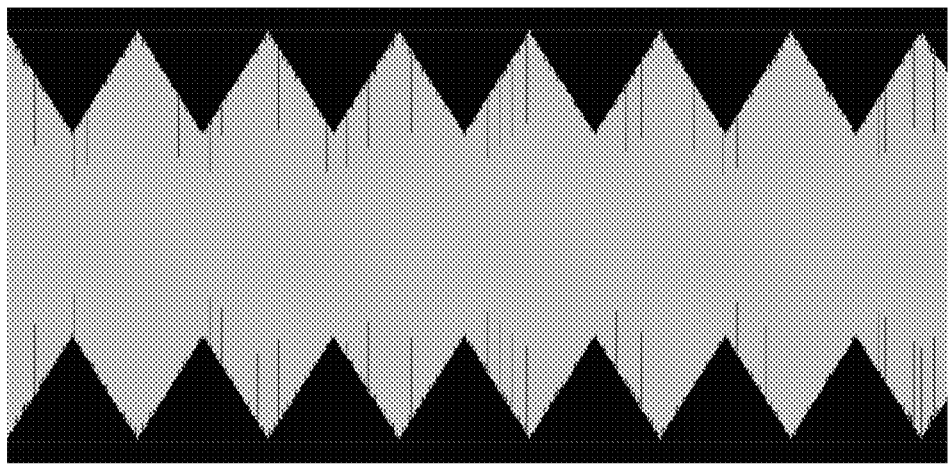
FIG. 17B shows a slowly varying enveloping using a continuous phase shape: triangular wave.
Figure 17C:
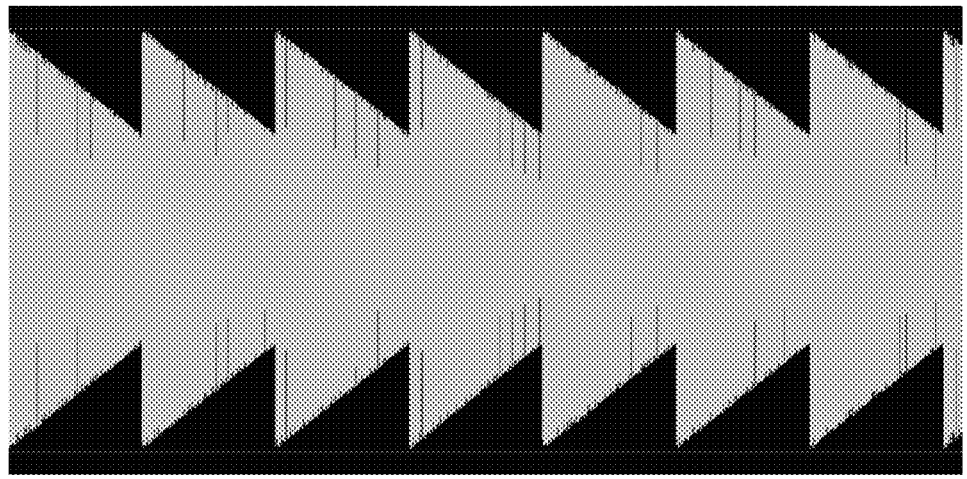
FIG. 17C shows a slowly varying enveloping using a non continuous phase shape: chain-saw tooth.

FIG. 17: slowly varying enveloping using A. continuous phase shape: sin wave, triangular wave B. non continuous phase shape: chain-saw tooth.

Data De-representation Steps—Details:

Step [9] is converting from digital symbols sinusoids into a formatted data bit stream in an inverse manner to step [7]. In general the conversion is done—according to the DOVe general modulation rule—by comparing each sinusoid amplitude (frequency) with its previous sinusoid amplitude (frequency). In case the previous is smaller, then a "1" is written into the data bit stream, in other cases a "0" is written into the data bit stream.

When trying to determine the current sinusoid frequency vs. the previous one, one may use a method of "up-sampling" followed by "zero crossing moving window search" over the stream of digital symbols in order to separate each sinusoid and determine its frequency according to the amount of samples between zero cross points. By doing so the process of conversion from symbols to bits is done in Time domain only a fact which significantly lowers the amount of operations required by CPU.

A special case is when using "distinct high level of amplitude" in step [5] for preamble bits. In this case if the sinusoid is not only bigger than the previous one but also has very high amplitude a "2" will be written into the data bit stream.

Data Deformation Steps—Details:

Step [10] is de-trans coding and is the inverse process to DOVe step [6] trans-coding and so its rules would be:

$$\begin{cases} 01 \to 0 \\ 10 \to 1 \\ \text{else} \to X/F \\ [20 \to P] \end{cases}$$

So target stream may contain 0, 1, X, F, [P].

While the first 2 rules are exactly the inverse of the trans-coding rules, the $3^{rd}$ one is meant for error handling. If from some reason (due to distortions in the voice channel) the data stream does not contain 01 or 10 (i.e. it contains "strange sequence" of 00 or 11), an error marker X/F is placed instead of 0 or 1, this for the purpose of later on trying to resolve the error. The choice between X/F is done by analyzing whether this error is classified as a flip error (F) or as an insertion/deletion error(X).

The classification is performed by a forward looking window function (which has a parametric size). The forward looking window function receives a bit stream, it checks the alignment of that bit stream to the expected 01,10 sequences and produces a "score" for that bit stream as measure of its alignment. The forward looking window function is called twice, once over the bit stream which starts at the 1$^{st}$ bit of the "strange sequence" and once again over the bit stream which starts at the 2$^{nd}$ bit of the "strange sequence". The score of the 2 calls is compared. If the 1$^{st}$ call has bigger or equal score then it means we haven't lost alignment and the error is flip error hence an F is placed in the target stream, but if the 2$^{nd}$ call has a bigger score then it means the error caused us a shift in alignment, meaning it is either an insertion or deletion of a bit and hence an X is placed it the target stream.

Only for the case of using "distinct high level of amplitude" in step [5] for preamble bits another rule will be added: 20→P where P represents a preamble bit and 2 represent a very high amplitude "1" representation.

Figure 18:
FIG. 18 shows data as a stream of pairs, each pair contains: (1) Preamble and (2) Payloads & FEC interleaved and stuffed.

FIG. 18: Data as a stream of pairs, each pair contains: (1) Preamble and (2) Payloads & FEC interleaved and stuffed.

Step [11] is synchronizing over the packets synchronization information and stripping it out of the data stream. As mentioned above synchronization information may be a special pattern in which case finding a synchronization sequence will be a simple search for the pattern in the data stream. If using a "distinct high level of amplitude" in step [5] to mark the synchronization information a search for P in the data stream will be done in order to find the synchronization information. Once found the synchronization information is stripped away.

Figure 19:
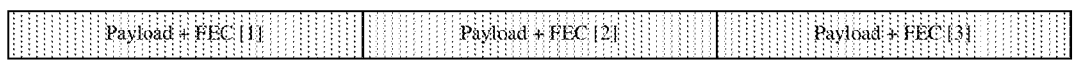
FIG. 19 shows data as a stream of Payloads & FEC interleaved and stuffed.

FIG. 19: Data as a stream of Payloads & FEC interleaved and stuffed.

The processing from this step onwards will be over the payload and FEC bits extracted from the packet.

In step [12] the amount of errors in the packet is counted, if the count of error is bigger then the maximum amount of fixable errors per packet, the packet is considered "unrecoverable" and dropped, otherwise a 2 phase iterative process of (1)"guess" the missing bits content and (2)"check" validity, is being performed. The "guess" phase is simply picking up a new bits option combination for each of the errors in the packet (i.e. X and F bits). The "check" phase includes steps [13], [14], [15]. The iterative process continuous as long as step [15] returns 'false' over the validity check, and it stops in one of the following 2 options: a. step [15] returned a 'true' over the validity check—in that case the packet is considered "extracted successfully", b. all bits options combinations has been tried—in that case the packet is considered "unrecoverable" and dropped.

Step [13] is de-stuffing and is the process of removing the "pattern breaking" control bits which were placed during Step [4] of stuffing (at the modulator) out of each packet.

After de-stuffing is finished all the bits in the packet are either original payload bits or original calculated FEC bits.

Figure 20:
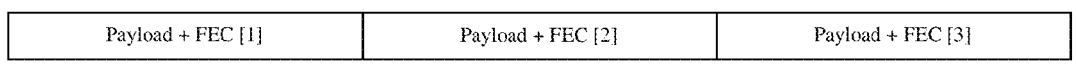
FIG. 20 shows data as a stream of Payloads & FEC interleaved.

FIG. 20: Data as a stream of Payloads & FEC interleaved.

Step [14] is de-interleaving and is the inverse of step [3]. After de-interleaving is finished the payload and FEC of each packet are separated, which allow the demodulator to continue with the next step which uses the FEC to check validity of the payload.

Figure 21:
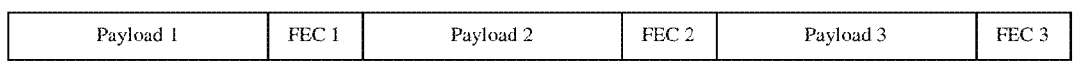
FIG. 21 shows data as a stream of pairs, each pair contains (1) Payload and (2) FEC.

FIG. 21: Data as a stream of pairs, each pair contains (1) Payload and (2) FEC.

Step [15] is checking validity. The validity check is done by "calc" & "compare". The "calc" means performing the calculation—the same calculation which is done at the modulator at step [2]—of the forward error correction (FEC) over each payload. The "compare" is comparing the calculation result with FEC received in the packet. If both are equal, check validity return TRUE else it return FALSE.

Step [16] aggregation is simply concatenating the data extracted from the payloads into one single stream of data.

Additional Notes:

The modulator shell produces the digital sinusoid waveform symbols (at step [7]) at a certain sample rate, preferably higher than the voice channel sample frequency (8 KHz). Choosing of a certain sample rate together with the fact that the carrier frequencies are also constant allows the usage of a LUT for symbols representation instead of online calculation and can hence reduce calculations dramatically.

Upon reception (before step [9]) the demodulator shall first up sample the waveforms and then convert the samples into symbols.

As opposed to voice content which is sensitive to delays (and hence cannot utilize retransmission to improve reliability) but less sensitive to packet drops, data content is often very sensitive to packet drops, and less sensitive to delays. When used to transfer non-voice content, DOVe uses (an optional) backward error correction mechanism of automatic repeat request (ARQ) so that any packet losses due to the voice channel distortions are eliminated by retransmission. The extra information required for ARQ is sent/received as a header inside each packet. This additional header information will eliminate the possibility of any data loss on the expense of reducing the overall throughput.

At the demodulator preferably but not necessarily a filter may be applied over the symbols waveforms samples before passing it to step [9] which converts it to digital bits. The filter purpose is to compensate & counteract as much as possible the distortions introduced by the voice channel. The filter if used shall be an adaptive filter whose coefficients will be re-calculated constantly and repeatedly updated by the following method: A "known data" (training) sequence will be modulated & sent by the modulator. The demodulator shall generate in advance the ideal modulation expected waveform symbols for that "known data" to be used as reference. The reference will be compared to the "known data" received waveform symbols at the demodulator, and from the comparison process new filter coefficients—representing the channel distortion—will be calculated and then updated.

Such known data may be—but doesn't have to be—the preamble of each packet, in which case the comparison will be triggered after every successful synchronization over a preamble.

In Addition once the data of a packet is successfully retrieved (FEC validity check result is TRUE at step [15]) the bits consisting the packet may be re-modulated (the same way done by the modulator in steps [2-8]) in order to extract its ideal waveform symbols. The packet's ideal waveform symbols may be compared with the packet received waveform symbols and from this comparison new filter coefficients will be calculated and then updated. By doing the later, the filter coefficients will update in a continuous manner (as opposed to only periodically when training sequence is sent). The 2 above mentioned functionalities of filtering and filter coefficients updating comes on the expense of demodulator complexity and processing time.

Figure 22:
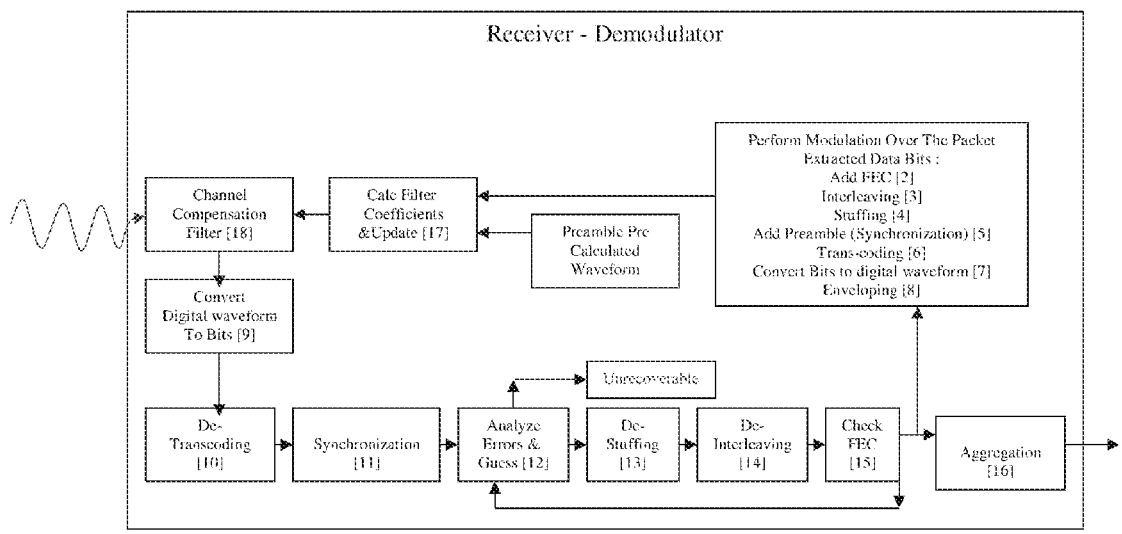
FIG. 22 shows DOVe Receiver (demodulator) blocks description when adding channel compensation filtering to counteract the distortions introduced by the voice channel.

FIG. 22: DOVe Receiver (demodulator) blocks description when adding channel compensation filtering to counteract the distortions introduced by the voice channel.

The invention claimed is:

1. A method, performed by a device, for converting digital data to an analog signal, the method comprising:
   modulating amplitude or frequency of the analog signal in a manner that includes representing digital bits of the digital data as combinations of periodic waveforms of low, medium and high levels of amplitude in the analog signal, if modulating the amplitude of the analog signal, or representing digital bits of the digital data as combinations of periodic waveforms of low, medium and high levels of frequencies in the analog signal, if modulating the frequency of the analog signal, wherein "1" is represented by a change in the amplitude or frequency levels to a higher amplitude relative to a previous waveform in the combinations of periodic waveforms, and wherein "0" is represented by a change in the amplitude or frequency levels to a lower amplitude relative to a previous waveform in the combinations of periodic waveforms.

2. The method of claim 1, further comprising transcoding the digital data that includes converting each bit of the digital data into two bits.

3. The method of claim 2, wherein the transcoding comprises converting "0" to "01" and converting "1" to "10".

4. The method of claim 1, further comprising arranging the digital data in packets, each of the packets including a payload and FEC information.

5. The method of claim 1, further comprising arranging the digital data in packets and adding a preamble to each packet of the digital data.

6. The method of claim 5, comprising representing the preamble in a uniquely distinct modulation pattern.

7. The method of claim 6, wherein the uniquely distinct modulation pattern comprises a representation symbol of a distinctly different amplitude than the low, medium and high levels of amplitude, or a distinctly different frequency than the low, medium and high levels of frequency.

8. The method of claim 6, wherein the uniquely distinct modulation pattern comprises a sequence of bits that is unlikely to occur in the representation of the digital data.

9. The method of claim 1, further comprising demodulating the modulated analog signal to extract the digital data.

10. The method of claim 1, further comprising transmitting the modulated analog signal over a voice channel.

11. A method, performed by a device, for converting digital data to an analog signal, the method comprising:

modulating amplitude or frequency of the analog signal in a manner that includes representing digital bits of the digital data as combinations of periodic waveforms of low, medium and high levels of amplitude in the analog signal, if modulating the amplitude of the analog signal, or representing digital bits of the digital data as combinations of periodic waveforms of low, medium and high levels of frequencies in the analog signal, if modulating the frequency of the analog signal, arranging the digital data in packets and adding a preamble to each packet of the digital data;

representing the preamble in a uniquely distinct modulation pattern, wherein the uniquely distinct modulation pattern comprises a representation symbol of a distinctly different amplitude than the low, medium and high levels of amplitude, or a distinctly different frequency than the low, medium and high levels of frequency.

\* \* \* \* \*